Dec. 29, 1942.    G. KEINATH    2,306,391
SYSTEM FOR RECORDING A PLURALITY OF MEASURING MAGNITUDES
Filed July 12, 1941
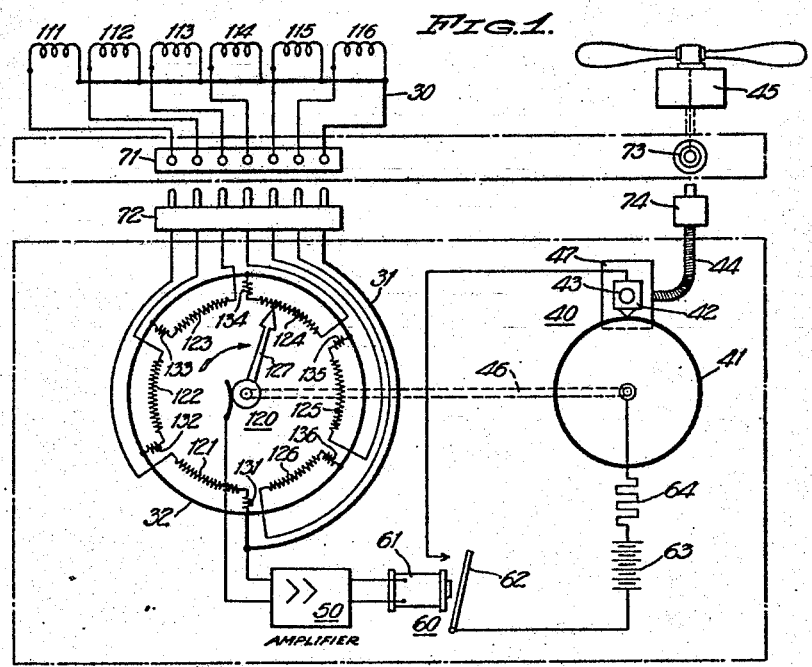
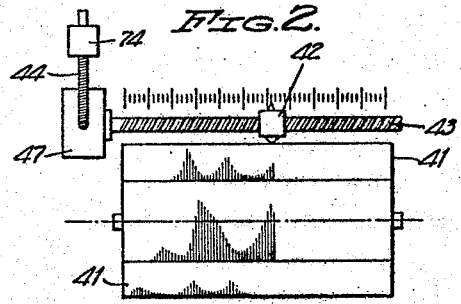
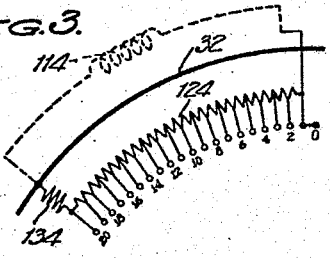
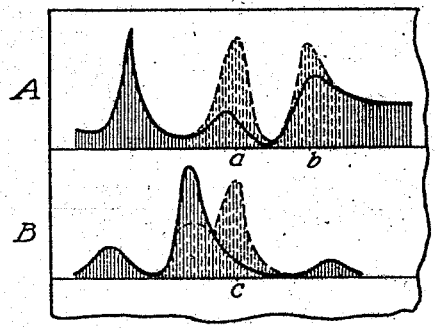
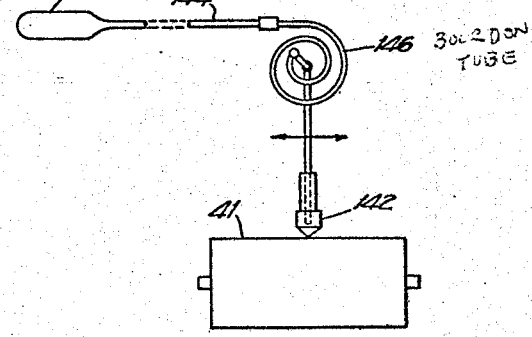
INVENTOR.
GEORGE KEINATH
BY
Knight Brothers
ATTORNEYS.

Patented Dec. 29, 1942

2,306,391

UNITED STATES PATENT OFFICE 2,306,391

SYSTEM FOR RECORDING A PLURALITY OF MEASURING MAGNITUDES

George Keinath, Larchmont, N. Y.

Application July 12, 1941, Serial No. 402,170

12 Claims. (Cl. 73—51)

My invention relates to electrical testing and measuring apparatus, and more particularly to apparatus for determining oscillatory magnitudes such as the frequency, amplitude and damping of mechanical vibrations in test objects, in order to determine the elasticity, internal friction and other mechanical properties.

In one of its basic aspects, the invention aims at providing improvements over the methods and means now available for testing mechanical properties of work pieces, machine parts, complete structures, such as airplanes and bridges, or the like objects, without requiring a destruction or disassembly of the object or structure to be tested.

There are already some methods for performing tests of this kind. One of the known methods permits determining cracks and flaws in machine parts of magnetic materials and involves passing a liquid with iron filings over the surface of the specimen while magnetizing the latter. The iron filings reveal the presence of defects by adhering to the surface areas whereunder the defects occur. This method has several limitations. It cannot be used with unmagnetic specimens. It is unsuitable for testing composite or complicated structures such as bridge or roof constructions, airplanes, vessels, or other vehicles. The method, as a rule, is inapplicable at unfinished surface portions of the test object. Furthermore, the presence of magnetic irregularities is not always indicative of an inferior test object, because the strength or durability of the object may be virtually unimpaired with respect to the intended operation of the object. Flaws deep below the surface do not always show up. Lastly, the method does not lend itself to automatically recording the test results.

Another known method involves the use of X-rays. Although this method can be applied to parts of any metal, it is rather cumbersome and expensive, because one X-ray exposure shows only cracks in the direction of the X-rays, so that for some objects up to three exposures are necessary. Such X-ray tests take considerable time and are limited to relatively small objects.

Another known method is the application of a mechanical vibration oscillator to the object under test, e. g. a railroad bridge. The frequency of the oscillator is varied within the available limits, and the power input to the oscillator is measured in watts. When the object comes in resonance, the electric energy put into the oscillator increases to a maximum. Hence, the watt magnitudes where energy maxima occur indicate those frequencies where the bridge structure vibrates in resonance. When repeating the tests after a certain period, any change in the resonance frequencies reveals corresponding changes in the elasticity of the structure, and any change in the width of the resonance curves, having the watt consumption plotted over the frequency magnitudes, reveals a change in the damping or interior friction of the structure. One of the shortcomings of this method is that it does not permit a conclusion as to the locality of a deterioration and the condition of the various vital parts of a structure.

It is an object of the invention to provide testing means for determining mechanical properties of test objects without destruction of the latter, while eliminating the above-mentioned limitations and disadvantages of the known methods. In particular, the invention aims at providing vibratory testing means applicable to objects or structures of any material, and producing a record of the properties determined. Other and more specific objects are to render such testing devices easily applicable on airplanes and the like complete structures, to facilitate making comparative tests between periods of operation or use of the structure so as to observe the effect of the actual operation or use of the structure on its essential mechanical properties.

In another basic aspect, the present invention is concerned with the determining and recording in one recording device and on one recording sheet a multitude of independent measuring values. In this respect, the object of the invention is to simplify the construction and to reduce the space requirements of the means serving for automatically collecting and transmitting the various magnitudes to the common recording sheet. The last-mentioned object is contemplated in general, as well as in conjunction with the objects relating to the vibratory tests previously mentioned.

These and other objects of my invention will be more fully understood from the following description taken in connection with the drawing.

Fig. 1 represents diagrammatically a multiple recording apparatus for testing vibration properties on airplanes, the recording device proper being shown in side elevation.

Fig. 2 shows the recording device proper of Fig. 1 in a front view, and

Fig. 3 another detail of Fig. 1 on an enlarged scale.

Fig. 4 represents schematically a record as obtained with a device according to Figs. 1 to 3.

Fig. 5 illustrates diagrammatically a different embodiment of the invention.

In Fig. 1, the coils 111 through 116 represent the transmitters of the magnitudes to be determined. In the case of an airplane to be tested as to its vibration conditions, the coils 111 through 116 consist of pick-up systems similar to those used for sound recording or reproducing. The pick-ups are permanently mounted on the airplane and located in vital spots, that is, in places where undue vibrations are apt to occur.

It is suggested that all planes to be tested in an air base are equally equipped. A common conductor 30 is connected with one pole of each pick-up and with a socket of a coupling member 71. The other poles of the pick-ups are connected with other sockets of the coupling member. The coupling member 71 is also permanently installed in the plane, for instance, on or near the instrument board. The airplane engine 45, representing the vibration generator, or a part driven by the engine is provided with a mechanical coupling member 73 which permits deriving a rotation of the same speed. This mechanical coupling member 73 is also permanently mounted on the airplane.

All other elements of the illustrated testing apparatus are arranged within a single, preferably portable, testing set. The set includes a potentiometric contact device 120, a recording device 40, an amplifier 50 and a relay 60. The construction of these units is more clearly apparent from Fig. 3 showing only one of the units and the appertaining circuit connections. As apparent from Fig. 3, each resistance unit contains a bank of for instance twenty-one contacts to be engaged sequentially by the movable contact 127. In Fig. 3, the contacts are numbered 0 through 20. They are connected with the end points and with intermediate points of the resistance so as to subdivide it into a sequence of resistance steps. The end contacts 20 of the six potentiometer units 121 through 126 are connected through series resistors 131 through 136, respectively, with a common conductor 32 which in turn is connected through a conductor 31 with one pole of a multiple coupling member 72 matching the coupling member 71. The end contacts 0 of the potentiometer units 121 through 126 are connected with the six other poles of the coupling member 72, so that when the coupling member 72 engages the member 71, the conductors 30 and 31 are interconnected and each pick-up coil 111 through 116 is connected through one of the resistors 131 through 136 with one of the potentiometer units 121 through 126.

The conductors 31 and 32 are also connected with one input pole of the amplifier, the movable contact 127 being connected with the other pole. Hence, the amplifier is controlled in accordance with the potentiometer voltage supplied by the movable contact 127.

The output circuit of the amplifier 50 leads to a relay 60 for controlling the operating circuit of a recording device 40. The recording device contains a rotary drum 41 for accommodating a recording sheet and a stylus 42 mounted on a worm shaft 43 which serves for moving the stylus along the recording drum in order to scan the surface of the recording sheet. The relay circuit includes a voltage source 63 and series resistor 64, and is connected with the stylus 42 and the recording drum. It is assumed that in the illustrated example, an electrolytic recording sheet is employed so that when the relay closes the control circuit a mark is produced by the stylus on the recording sheet due to the passage of current from the stylus through the electrolytic paper to the metallic drum 41.

The shaft of the recording drum 41 is connected with the shaft of the movable contact member 127 so that both rotate in synchronism with each other. The movable contact member 127 and the drum are driven by any suitable means, for instance by an electric motor (not illustrated) of constant speed. The worm shaft 43 of the stylus 42 is connected with a vibration generator serving to subject the object to be tested to mechanical vibrations. In the case of an airplane, the vibration generator, as already mentioned, consists preferably of the airplane motor and propeller so that no additional generator is needed. Consequently, in the embodiment illustrated in Figs. 1 and 2, the worm shaft 43 is actuated by a tachometer 47 to be connected with the airplane engine. The connection is established by means of a flexible shaft 44 ending in a coupling member 74 matching the coupling member 73.

When in operation, the contact device 120 functions as follows. When the movable contact 127, while moving in the direction of the arrow, engages the first contact 20 of a contact bank, for instance of bank 124, the voltage supplied to the input circuit of the amplifier 50 is a minimum whose magnitude depends on the resistance of the series-connected resistor 134. Consequently, in this position of the movable contact the relay 60 is deenergized and the control circuit of the recording device is open. Hence, no mark is produced by the stylus 42 on the recording sheet. As the movable 127 moves along, the voltage drop between the conductor 32 and the movable contact increases. So long as this voltage drop remains below the minimum necessary for causing the amplifier 50 to energize the relay 60, no record is produced by the recorder 40. However, as soon as the movable contact 127 reaches a position where the voltage drop derived from the contact bank surpasses this minimum voltage, the relay 60 is energized and the recorder circuit closed so that the stylus produces a mark on the record sheet. The recording device remains effective until the movable contact 127 leaves the end point 0 of the contact bank 124. When now the movable contact passes to the first contact 20 of the next contact bank 125, the input voltage at the amplifier is at first again so low that the relay falls off and interrupts the recorder circuit. As soon as in the next contact bank 125 the voltage drop transmitted to the amplifier exceeds the minimum input voltage required for actuating the relay 60, the recording device is again energized and produces another mark whose length again depends on the length of the path still to be traversed by the movable contact member until it reaches the end contact of the third contact band 126. In this manner, the six contact banks are scanned sequentially and six markings are produced on the record sheet corresponding to the vibration amplitudes of the test object at the six points where the pick-up coils are located. Of course, if no appreciable vibrations exist at any of the pick-up coils, no mark is recorded in the appertaining section of the record sheet because then the voltage supplied to the amplifier remains below the operating minimum.

In order to test an airplane, the portable recording set is taken aboard and plugged into the electric coupling member 71 and the mechanical coupling member 73. After that, the apparatus is ready for operation. Now, the plane is subjected to oscillatory stresses. This can be done on ground or better in a test flight, the power plant of the airplane serving as the vibration generator. In a test flight, the plane is flown on a straight or otherwise fixed and reproducible course, at constant height and under relatively stable conditions of air and wind. While maintaining the prescribed test course, the motor speed is gradually increased from a minimum to the maximum value within a given time, for instance about five minutes. During this period of acceleration, the testing apparatus is operated and records a set of vibration diagrams showing vibration amplitudes in dependence upon the vibration frequency, i. e. the number of motor revolutions per minute.

The set of vibration diagrams thus obtained is characteristic of the conditions of the airplane structure during the testing period. After return to the air base, the diagram is compared with a standard diagram, if this was the first test flight of a new airplane, or with diagrams obtained in previous test flights of the same plane. If the diagrams show no substantial change as compared with the standard or previous diagram, the record indicates that the mechanical conditions of the structure are satisfactory and have not suffered any substantial deterioration as compared with the previous test flight. If a change is noticeable especially in the damping, a close inspection will reveal the cause of the deterioration so that it can be located and eliminated. A repeated test flight will then show whether the airplane is again in satisfactory mechanical condition.

Fig. 4 shows schematically two diagrams as obtained in such test flights. The abscissa of each diagram indicates the frequency of the oscillator and the ordinate represents the amplitude of the vibration. Diagram A is obtained with one of the pick-ups and diagram B with another pick-up located at a different place of the airplane structure. The areas under the curves of a first test flight are shaded with full lines. The corresponding diagrams obtained in a second test flight are indicated and shaded with broken lines. It will be seen, for instance, from diagram A that the second test flight revealed increased vibration amplitudes at the frequencies $a$ and $b$. This indicates a deterioration, for instance that the material has cracked or that a connection has become loose or a certain part weakened. Since the location of the pick-up is known, the point where these increased variations occur can easily be located. The comparison with the other diagrams shows whether the increase at the frequencies $a$ and $b$ occurs also at other spots and hence is due to some general cause, or whether it is limited to the particular spot of the one pick-up and hence due to local causes. The width of the vibration maxima in each diagram indicates the magnitude of the damping. Changes in the damping also are indicative of changes in the mechanical properties of the structure and its materials. In diagram B, Fig. 4, for instance, the second test flight indicates that a new vibration has come up at the frequency $c$. This also is indicative of some defect which has to be eliminated in order to bring the airplane into satisfactory shape.

In order to afford the above-described results, the different parts of the testing apparatus are preferably designed as set forth in the following.

While the foregoing example assumes a measuring of the vibration amplitude, the testing apparatus according to the invention affords also a determination of the vibration velocity and the vibration acceleration. Any kind of pick-up as employed for electroacoustic recording or reproducing can be used such as quartz or Rochelle salt pick-ups, electromagnetic or electrostatic pick-ups. With respect to airplanes, the Rochelle salt pick-up is less recommendable because it deteriorates at the high temperatures occurring in airplanes in bright sunshine on the ground. It is also difficult to make such pick-ups sufficiently uniform in sensitivity and to keep their properties constant for a sufficient length of time.

However, when using pick-ups having permanent magnets and moving coils respectively, it is easy to obtain and maintain a uniform sensitivity of all the pick-ups used within a multiple recording apparatus. The output may be low because it is passed through an amplifier before being transmitted to the relay or recording device proper.

In the above-discussed example, it is assumed that each individual potentiometer resistor is subdivided into twenty contact steps (Fig. 3). This number of steps is sufficient to obtain a satisfactory accuracy for most measuring purposes, including the testing of airplanes. However, it is also possible to employ a smaller or greater number of resistance steps, depending upon the particular measuring purposes. For instance, potentiometers with 100 and 200 resistance steps are applicable without causing undue difficulties.

The voltage supplied from each pick-up to the appertaining resistance unit starts with an initial value at one end point of the contact bank and increases stepwise towards the other end. The resistance steps of the resistance unit are preferably so dimensioned that the position of the moving contact, when deriving just enough voltage to start the recording proper, is in linear proportion, within the resistance limits of the potentiometer, to the voltage amplitude supplied by the pick-up. This desired proportionality between the amplitude of vibration and voltage to the amplitude to be recorded in the diagram cannot be obtained if the potentiometer steps are of uniform resistance magnitude. Therefore, the resistance steps are so dimensioned that their resistance magnitude increases in a hyperbolic function if a linear amplitude scale is desired. In this case, the resistance of the individual steps can be calculated in the following way.

If $R_{max}$ is the total resistance of the individual potentiometer unit and $n$ the number of the resistance step taken in the consecutive order in which they occur within the unit, the following condition should be fulfilled by the resistance magnitude of the resistance step:

$$R_n = \frac{R_{max}}{n}$$

The minimum resistance ($R_{min}$) of the unit, that is, the resistance effective when the movable contact engages the first contact step is $$R_{min} = \frac{R_{max}}{20}$$

The following numerical example will elucidate the foregoing formulas.

Let the maximum voltage (E. M. F.) generated by a pick-up for the maximum vibration within the scale range of the recorder be 1000 millivolts, the minimum E. M. F. necessary to start the recording operation one-twentieth thereof, that is, 50 millivolts, and the total resistance of each potentiometer unit 10,000 ohms. Under these conditions, the resistance magnitudes of the individual twenty resistance steps are as indicated in the following table:

| Step No. $n=$ | Resistance in ohms |
|---|---|
| 20 | 500 |
| 19 | 526 |
| 18 | 555 |
| 17 | 588 |
| 16 | 625 |
| 15 | 667 |
| 14 | 714 |
| 13 | 769 |
| 12 | 833 |
| 11 | 909 |
| 10 | 1,000 |
| 9 | 1,111 |
| 8 | 1,250 |
| 7 | 1,429 |
| 6 | 1,667 |
| 5 | 2,000 |
| 4 | 2,500 |
| 3 | 3,333 |
| 2 | 5,000 |
| 1 | 10,000 |
| 0 | 10,000 |

It will be understood that while I have described a hyperbolic gradation of the potentiometer units in order to obtain a proportional scale law, any other desired scale law is also obtainable by correspondingly graduating the resistance steps. For instance, a logarithmic amplitude scale is sometimes of value.

The resistances appertaining to the potentiometric contact device are preferably of ohmic character, although inductive potentiometers are also applicable. The amplifier and relay are so adjusted that with 50 millivolts at the input of the amplifier, the full D. C. voltage is applied to the recording paper and hence the record started. With 1000 millivolts in the pick-up, one obtains 50 millivolts on the amplifier when the movable contact engages the contact step 20 taking the potential from the first resistor (134 in Fig. 3) of 500 ohms. As long as the movable contact travels along the other twenty contacts, the input voltage of the amplifier increases to the maximum voltage so that the recording device continues to be energized and to produce a record corresponding to the maximum vibration amplitude, twenty times the relay sensitivity.

If now the E. M. F. in the pick-up is only 300 millivolts, the moving contact will find the necessary 50 millivolts at the sixth contact step where the resistance is 1667 ohms, i. e. one-sixth of the total 10,000 ohms. Consequently, a line is written by the recording device only during the period when the moving contact travels from contact 6 to contact 0. Consequently, the line representing the amplitude of the vibration corresponds now only to six resistance intervals, to six times the relay sensitivity.

If only 100 millivolts are supplied by the pick-up, the necessary 50 millivolts for starting the operation of the recorder appear at the contact 2 and the line recorded on the recording paper shortens correspondingly.

The foregoing shows that the recording apparatus according to the invention involves a new principle of recording in which the amplitude, speed or acceleration of a vibration or any electric voltage is transformed into an angle or into a length of a recorded line starting with zero amplitude. A given minimum voltage is fixed for starting the recording operation proper and all higher values to be measured and recorded are expressed in multiples of the given minimum.

The amplifier may produce a D. C. or A. C. output voltage. At input voltages higher than the above-mentioned minimum, the amplification factor of the amplifier should decrease, yet this is not an absolutely necessary requirement; nor has the amplifier to comply with other exacting conditions because it is merely used to energize the relay. Before the test, amplifier and relay are set to proper sensitivity.

The relay may be either electronic or electromagnetic, A. C. or D. C.

The recording device may operate electrolytically and as described above, or it may be designed and operated in any other suitable and known manner. For instance, a condenser discharge circuit controlled by the relay can be employed for causing the stylus to indicate dot marks; likewise ink recorders, or recorders with a recording sheet supplied from a storage roll.

In concluding the description of the foregoing embodiment of the invention, it will be understood that while having dealt with a testing device preferred for the use in airplanes and in military and other air bases, I also contemplate other modifications depending upon the requirements of particular testing conditions. For instance, when desired, the recording apparatus may be permanently installed in the structure to be tested so that no intermediate coupling devices, such as members 71, 72 and 73, 74, are required. It is also to be understood that testing devices according to the invention can also be used for objects other than airplane structures. For instance, bridge and building constructions can be tested in the same way and with the same means.

The invention is further advantageous in all cases where a permanent record of vibration properties is desired. This is the case, for instance, with high speed war vessels such as torpedo boats and speed boats. The enormous vibrations caused by the superpowered motors on such vessels, as well as by the stresses caused by the discharge of guns, make it necessary to submit the vessels frequently to tests in order to determine whether they are still in satisfactory condition. The invention affords performing such tests within very short testing periods and with so little inconvenience that the tests can be repeated more frequently than heretofore feasible.

Another field of application is the use of the invention for testing smaller and unitary test objects, such as individual propellers, crank shafts of engines and the like machine parts and work pieces. That is, the invention can be used in places where heretofore the iron filings method was the only practical means for discovering defects. For testing such objects, a single transmitter or pick-up is, as a rule, sufficient, so that the contact device need be provided with only one resistance unit and contact bank. For such smaller test objects, the time for taking a diagram can be reduced considerably, for instance to one minute and less, provided the test object itself can follow an increase in vibration frequency in so short a time. A slide wire potentiometer with twenty subdivisions as above assumed can travel much faster than required by such a reduced testing period. The time lag of the electrolytic paper, as well as the time lag of an electronic relay, is under one-tenth of a millisecond. Potentiometer devices of the type here in point can travel as fast as several hundred up to about 800 contacts per second without serious difficulty. Assuming 50 contact potentiometers, 16 measurements per second can be made per second, one during each 60 milliseconds. Hence the invention is applicable within a very wide field of various vibratory testing purposes and is also suitable for high speed purposes.

However, the invention is likewise suitable and advantageous for non-vibratory applications. Obviously, the illustrated measuring and recording systems operate in the same manner if the voltage produced by the transmitters 111 through 116 is not caused by vibrations but by any other suitable cause. Consequently, the apparatus is capable of recording any measuring magnitude, and in particular a plurality of such magnitudes, capable of causing, or being converted into, a voltage variation. This will be elucidated by the following example with reference to Fig. 5 of the drawing and in conjunction with Fig. 1.

The recording system proper, shown in Fig. 1, can be used for indicating the expansion of a structure in dependence upon the temperature. This is of interest, for instance, in such concrete constructions as the dams of hydroelectric plants. In such a case, the transmitters 111 through 116 (in Fig. 1), instead of being the coils of vibration pick-ups, are connected to electric extension meters embedded in various parts of the same dam. The coils are connected in the diagonal of an A. C. or D. C. bridge circuit and indicate variations of length, pressure or stress by a corresponding voltage variation. The stylus 42, instead of being driven from a vibration generator, is moved along the drum in dependence upon the temperature, or any other desired determinant. Thus, Fig. 5 shows a front view of a recording device proper which in contrast to the one shown in Fig. 2 has a stylus 142 connected with a thermometric device comprising a thermometric bulb 145, a capillary 144 and a mechanism 146 for converting pressure changes within the bulb into angular movements of the stylus. As a result, the stylus records changes in expansion or stress in the structure in dependence upon the temperature. As the changes in temperature are very slow, with a maximum and minimum about a half year apart, it suffices to effect one revolution of the recording drum once an hour, for instance, so that one obtains 8760 points per year for each of the diagrams, automatically switching on the current supply only one minute per hour.

Another type of multi-diagrams is possible by using only one pick-up and one potentiometer of the six indicated in Fig. 1, the single record reaching over only a fraction, e. g. one-sixth, of the drum circumference. A frequency-amplitude diagram is made in long intervals, e. g. every hour, but the relative angle between the drum 40 and the potentiometer arrangement 120 is changed mechanically by a clockwork, so that it shifts about four degrees every hour. In the time between the taking of the vibration-frequency diagrams, the object is submitted to a fatigue test, with constant frequency interrupted every hour for one minute. In this manner, one obtains one hundred diagrams on the sheet within one hundred hours, and any change is easily visible. The time when such a change occurs is also indicated, which is important for fatigue test. One may effect the shift between drum and potentiometer in a logarithmic time scale, for instance, after 10 minutes, 100 minutes, 1,000 minutes and 10,000 minutes, which is sometimes desired for fatigue tests.

I claim:

1. Vibratory testing apparatus, comprising a vibration generator for causing a test object to effect mechanical vibrations, pick-up means for producing electric variations in accordance with mechanical vibrations of the test object, a potentiometric device having a series arrangement of resistors and contacts connected with said pick-up means and a contact member movable relative to said contacts for sequentially engaging said contacts, a recording device having a carrier for a record sheet and a recording element for effecting a record on the sheet, said carrier and said recording element being movable in two scanning directions relatively to each other, said recording device being connected with said vibration generator and said movable contact member respectively, so that the relative movements of said carrier and said recording element in one of said directions are dependent upon the movement of said contact member and in said other direction on the vibration frequency of said generator, relay means connected intermediate said potentiometric device and said recording device for energizing the latter, said relay means being responsive to a given minimum operating voltage, and said resistance steps having successively increasing magnitudes.

2. Vibratory testing apparatus, comprising a vibration generator for causing a test object to effect mechanical vibrations, pick-up means for producing electric variations in accordance with mechanical vibrations of the test object, a potentiometric device having a series arrangement of resistors and contacts connected with said pick-up means and a rotary contact member for sequentially engaging said contacts, a recording device having a rotary cylindrical member for accommodating a record sheet and a recording member movable longitudinally relative to said cylinder, said cylinder being connected with said contact member to rotate in synchronism therewith, and said recording member being connected with said generator to move in dependence upon the vibration frequency of said generator, relay means connected intermediate said potentiometric device and said recording device for energizing the latter, said relay means being responsive to a given minimum operating voltage, and said resistance steps having successively increasing resistance magnitudes.

3. Vibration recorder, comprising a frequency-controllable vibration generator for subjecting a test object to mechanical vibrations, a plurality of pick-ups for producing electric voltage variations in accordance with the mechanical vibrations at different places of the test object, a contact device having a plurality of contact banks sequentially arranged and individually connected with said pick-ups respectively, each of said banks consisting of a series arrangement of resistance steps, and a contact member periodically movable relative to said contact banks for sequentially scanning said banks, a recording device having a carrier for a record sheet and a recording element for effecting a record on the sheet, said carrier and said recording element being movable in two scanning directions relatively to each other, said recording device being connected with said vibration generator and said contact device respectively, so that the relative movements of said carrier and said recording element in one of said directions are dependent upon the movement of said member and in said other direction on the vibration frequency of said generator, and an electric connection between said contact device and said recording device, whereby said recording device is caused to start recording whenever said contact member passes through a resistance step, within each of said banks, which corresponds to a given minimum voltage of said pick-ups respectively.

4. Vibration recorder comprising a frequency-controllable vibration generator for subjecting a test object to mechanical vibrations, a plurality of pick-ups for producing electric voltage variations in accordance with the mechanical vibrations at different places of the test object, a potentiometric contact device having a plurality of sequentially-arranged resistance units individually connected with said pick-ups respectively, and a contact member periodically movable relative to said resistance units for sequentially scanning said units, a recording device having a carrier for a record sheet, and a recording element for effecting a record on the sheet, said carrier and said recording element being movable in two scanning directions relatively to each other, said recording device being connected with said vibration generator and said movable member of said potentiometric device respectively, so that the relative movements of said carrier and said recording element in one of said directions are dependent upon the movement of said member and in said other direction on the vibration frequency of said generator, and electric relay means connected intermediate said contact member and said recording device for causing the latter to effect a recording in dependence upon the voltage supplied by said contact member to said relay passing through a given magnitude.

5. Vibration recorder, comprising a frequency-controllable vibration generator for subjecting a test object to mechanical vibrations, a plurality of pick-ups for producing electric voltage variations in accordance with the mechanical vibrations at different places of the test object, a potentiometric contact device having a plurality of stepped resistance units individually connected with said pick-ups respectively, and a contact member periodically movable relative to said resistance units for sequentially scanning said units, a recording device having a carrier for a record sheet and a recording element for effecting a record on the sheet, said carrier and said recording element being movable in two scanning directions relatively to each other, said recording device being connected with said vibration generator and said movable member of said potentiometric device respectively, so that the relative movements of said carrier and said recording element in one of said directions are dependent on the movement of said member and in said other direction on the vibration frequency of said generator, and electric relay means connected intermediate said contact member and said recording device for energizing said latter device periodically in dependence upon the voltage supplied from said pick-ups to said movable contact member, said resistance steps of said units having resistance magnitudes increasing sequentially in accordance with the hyperbolic function.

6. Vibration recorder, comprising a frequency-controllable vibration generator for subjecting a test object to mechanical vibrations, a plurality of pick-ups for producing electric voltage variations in accordance with the mechanical vibrations at different places of the test object, a potentiometric contact device having a rotary contact member and a plurality of resistance units arranged around said contact member to be sequentially scanned thereby, said resistance units being individually connected with said pick-ups respectively, a recording device having a rotary cylindrical member for accommodating a record sheet and a recording member movable longitudinally relatively to said cylinder, said cylinder being connected with said contact member to rotate in synchronism therewith, and said recording member being connected with said generator to move in dependence upon the vibration frequency of said generator, relay means connected intermediate said potentiometric device and said recording device for energizing the latter, said relay means being responsive to a given minimum operating voltage, said resistance steps having increasing resistance magnitudes from one end towards the other end of each unit.

7. Apparatus for recording a plurality of independent measuring magnitudes, comprising a plurality of transmitters for supplying said magnitudes respectively, a contact device having a movable contact member and a plurality of resistance units arranged relative to said contact member to be sequentially scanned thereby, said resistance units being individually connected with said transmitters respectively, a recording device having two movable recording members arranged relative to each other to produce a record, means for moving one of said members in dependence upon a control magnitude, said other recording member being connected with said contact member to move in synchronism therewith, and a relay electrically connected between said contact member and said recording device for energizing the latter so as to cause said recording members to effect a record in dependence upon the passage through a given value of the voltage taken off said units respectively by said contact member when in motion.

8. Apparatus for recording measuring magnitudes, comprising a plurality of transmitters for supplying said magnitudes respectively, a potentiometric contact device having a movable contact member and a plurality of stepped resistance units each having a series of contact steps arranged so as to be sequentially engaged by said contact member when in operation, a recording device having a carrier member for accommodating a record sheet and a recording member for producing a record on the sheet, said two members of said recording device being independently movable in two directions relatively to each other to effect scanning of the sheet, driving means for moving one of said two members, and coupling means connecting said other member of said recording device with said contact member to move both in synchronism with each other, an electric circuit connecting said contact device with said recording device for energizing the latter to produce a record, said circuit containing a relay for controlling said recording device, said relay being responsive to a given voltage magnitude, and said resistance steps of said contact device having resistance magnitudes increasing from one towards the other end of each resistance unit.

9. A structure to be repeatedly subjected to vibration tests, having a plurality of pick-ups arranged at different points of the structure where vibrations are apt to occur, and an electric coupling member mounted on the structure and electrically connected with said pick-ups, in combination with a separate recording set comprising an electric coupling member for detachably engaging said coupling member of said structure, a contact device having a periodically movable contact member and a plurality of resistance units arranged in series so as to be scanned sequentially by said contact member, said units being connected with said second coupling member so as to be in individual connection with said pick-ups respectively when said two coupling members engage each other, a recording device having a rotary member for accommodating a record sheet and a rectilinearly-movable recording member for producing a record on the sheet, drive means connected with said recording member for moving it in accordance with the vibration frequency, and a connection between said rotary member and said contact member for moving both in synchronism with each other, and a relay circuit electrically connecting said contact device with said recording device to energize the latter in dependence upon the passing through of a given magnitude of the voltage supplied from said pick-ups through said contact member to said relay.

10. An airplane having a propeller motor and means for performing vibration tests, said means comprising a plurality of pick-ups arranged at different points of the airplane, a multiple electric coupling member mounted on the airplane and having individual outlets connected with said pick-ups respectively, and mechanical coupling means connected with the airplane motor to derive therefrom a periodic synchronous motion, in combination with a separate recording set comprising an electric coupling member for detachably engaging said coupling member of said airplane, a contact device having a periodically movable contact member and a plurality of resistance units arranged in series so as to be scanned sequentially by said contact member, said units being connected with said second coupling member so as to be in individual connection with said pick-ups respectively when said two coupling members engage each other, a recording device having a rotary member for accommodating a record sheet and a rectilinearly-movable recording member for producing a record on the sheet, drive means for actuating said recording member, said drive means comprising mechanical coupling means for detachably engaging said mechanical coupling means of said airplane, and a connection between said rotary member and said contact member for moving both in synchronism with each other, and a relay circuit electrically connecting said contact device with said recording device to energize the latter in dependence upon the voltage, supplied from said pick-ups through said contact member to said relay, passing through a given magnitude.

11. In a testing apparatus as set forth in claim 1, said resistance steps increasing from one end towards the other of each of said resistors in accordance with a hyperbolic function.

12. System for recording measuring magnitudes, comprising transmitting means for supplying the magnitude to be recorded, a potentiometric contact device having a movable contact member and resistance means arranged relative to said contact member to be scanned thereby and connected with said transmitting means so as to be supplied with a voltage varying in accordance with the magnitude to be recorded, said resistance means having steps of different resistance magnitudes increasing from one towards the other end of said resistance means, a recording device having two movable recording members arranged relative to each other to produce a record, means for moving one of said members in dependence upon a control magnitude, drive means for moving said other recording member in synchronism with said contact member, and a relay electrically connected between said contact member and said recording device for energizing the latter so as to cause said recording members to effect a record in dependence upon the passage through a given value of the voltage taken off said resistance means by said contact member when in motion.

GEORGE KEINATH.